(12) United States Patent
Gilbert et al.

(10) Patent No.: US 9,167,479 B2
(45) Date of Patent: Oct. 20, 2015

(54) METHOD AND APPARATUS FOR QUEUED ADMISSIONS CONTROL IN A WIRELESS COMMUNICATION SYSTEM

(71) Applicant: Motorola Solutions, Inc., Schaumburg, IL (US)

(72) Inventors: Stephen S. Gilbert, Lake Zurich, IL (US); Donald G. Newberg, Hoffman Estates, IL (US); Baruh Hason, Tel Aviv-Yaffo (IL); Gabi Ofri, Reshon Letzion (IL); Salomon Serfaty, Gaash (IL)

(73) Assignee: Motorola Solutions, Inc., Schaumburg, IL (US)

( * ) Notice: Subject to any disclaimer, the term of this patent is extended or adjusted under 35 U.S.C. 154(b) by 104 days.

(21) Appl. No.: 13/839,752

(22) Filed: Mar. 15, 2013

(65) Prior Publication Data
US 2014/0274080 A1    Sep. 18, 2014

(51) Int. Cl.
*H04W 28/02*    (2009.01)
*H04W 4/10*    (2009.01)
*H04W 76/00*    (2009.01)
(Continued)

(52) U.S. Cl.
CPC .............. *H04W 28/14* (2013.01); *H04W 28/16* (2013.01); *H04W 76/005* (2013.01); *H04W 4/10* (2013.01)

(58) Field of Classification Search
CPC ..... H04W 28/02; H04W 48/02; H04W 48/06; H04W 76/02; H04W 28/0231; H04W 28/00; H04W 28/0278; H04W 28/0284; H04W 28/0289

USPC .................................................. 455/450, 453
See application file for complete search history.

(56) References Cited

U.S. PATENT DOCUMENTS 6,775,242 B2    8/2004    Grilli et al.
7,738,423 B2    6/2010    Khan
(Continued)

FOREIGN PATENT DOCUMENTS

CN    101 325 791 A    12/2008
EP    1 581 014 A1    9/2005
(Continued)

OTHER PUBLICATIONS

"Multimedia Broadcast and Multicast Services in 3G Mobile Networks," Alcatel Telecommunications Revenues, pp. 1-12, Apr. 1, 2004.

(Continued)

*Primary Examiner* — Marisol Figueroa
(74) *Attorney, Agent, or Firm* — Steven A. May

(57) ABSTRACT

A method and services network element are provided that provide for queued admissions control in a wireless communication system by receiving a bearer establishment request associated with a user equipment, determining that a cell where the user equipment is located is congested, in response to determining that the cell is congested, creating a bearer establishment request record (BERR) associated with the user equipment and the bearer establishment request, wherein the BERR comprises priority information associated with the BERR, and adding the BERR to a queue, wherein the queue is associated with a cell serving the user equipment, wherein the BERR is positioned in the queue based on the priority information, and wherein bearer establishment requests associated with BERRs in the queue are submitted based on a position of the BERRs in the queue.

28 Claims, 9 Drawing Sheets

(51) Int. Cl.
*H04W 28/14* (2009.01)
*H04W 28/16* (2009.01)

(56) References Cited

U.S. PATENT DOCUMENTS

| | | | |
|---|---|---|---|
| 7,995,510 B2 | 8/2011 | Gao | |
| 8,098,590 B2 | 1/2012 | Catovic et al. | |
| 8,175,069 B2 | 5/2012 | Wang et al. | |
| 8,451,410 B2* | 5/2013 | Kim et al. | 349/139 |
| 8,576,763 B2 | 11/2013 | Gonsa et al. | |
| 8,738,003 B2* | 5/2014 | Mildh | 455/439 |
| 2003/0088675 A1* | 5/2003 | Zheng | 709/227 |
| 2003/0148779 A1 | 8/2003 | Aravamudan et al. | |
| 2003/0211859 A1 | 11/2003 | Chen et al. | |
| 2004/0184470 A1* | 9/2004 | Holden | 370/412 |
| 2005/0227718 A1* | 10/2005 | Harris et al. | 455/509 |
| 2005/0235289 A1 | 10/2005 | Barillari et al. | |
| 2005/0260997 A1 | 11/2005 | Korale et al. | |
| 2005/0276256 A1* | 12/2005 | Raitola et al. | 370/349 |
| 2006/0111104 A1* | 5/2006 | Hyslop | 455/435.1 |
| 2007/0133527 A1 | 6/2007 | Kuure et al. | |
| 2007/0264992 A1 | 11/2007 | Maenpaa | |
| 2007/0281722 A1 | 12/2007 | Gao | |
| 2008/0102811 A1 | 5/2008 | Amirjoo et al. | |
| 2008/0212583 A1 | 9/2008 | Rey et al. | |
| 2008/0293428 A1 | 11/2008 | Rey et al. | |
| 2008/0311892 A1 | 12/2008 | Lee et al. | |
| 2009/0080363 A1 | 3/2009 | Song et al. | |
| 2009/0103466 A1 | 4/2009 | Gu et al. | |
| 2009/0113487 A1 | 4/2009 | Nanjunda Swamy | |
| 2009/0207773 A1 | 8/2009 | Feng et al. | |
| 2009/0323638 A1 | 12/2009 | Catovic et al. | |
| 2010/0027541 A1 | 2/2010 | Eriksson et al. | |
| 2010/0061308 A1 | 3/2010 | Becker et al. | |
| 2010/0081451 A1 | 4/2010 | Mueck et al. | |
| 2010/0128649 A1 | 5/2010 | Gonsa et al. | |
| 2010/0222055 A1 | 9/2010 | Cho et al. | |
| 2010/0232340 A1 | 9/2010 | Godor et al. | |
| 2010/0265867 A1 | 10/2010 | Becker et al. | |
| 2010/0302988 A1 | 12/2010 | Becker | |
| 2010/0323698 A1* | 12/2010 | Rune et al. | 455/436 |
| 2011/0077006 A1 | 3/2011 | Hsu | |
| 2011/0128903 A1 | 6/2011 | Futaki et al. | |
| 2011/0145846 A1 | 6/2011 | Kim | |
| 2011/0159880 A1 | 6/2011 | Kumar et al. | |
| 2011/0305183 A1 | 12/2011 | Hsu et al. | |
| 2011/0305184 A1 | 12/2011 | Hsu | |
| 2012/0008525 A1 | 1/2012 | Koskinen | |
| 2012/0014264 A1 | 1/2012 | Wang | |
| 2012/0033623 A1 | 2/2012 | Chu et al. | |
| 2012/0170501 A1 | 7/2012 | Drozt et al. | |
| 2012/0170502 A1 | 7/2012 | Korus et al. | |
| 2012/0172028 A1 | 7/2012 | Korus et al. | |
| 2012/0230240 A1 | 9/2012 | Nebat et al. | |
| 2012/0236776 A1 | 9/2012 | Zhang et al. | |
| 2013/0064160 A1 | 3/2013 | Newberg et al. | |
| 2013/0301509 A1 | 11/2013 | Purnadi et al. | |
| 2014/0177436 A1 | 6/2014 | Korus et al. | |
| 2014/0177437 A1 | 6/2014 | Korus et al. | |

FOREIGN PATENT DOCUMENTS

| | | |
|---|---|---|
| WO | 02089501 A1 | 11/2002 |
| WO | 03098871 A1 | 11/2003 |
| WO | 2011000947 A1 | 1/2011 |
| WO | 2011068421 A1 | 6/2011 |

OTHER PUBLICATIONS

3rd Generation Partnership Project (3GPP), "3GPP TS 26.246 V9.0.0: Technical Specification Group Services and System Aspects; Transparent end-to-end packet switched streaming service (PSS); 3GPP SMIL Language Profile (Release 9)," 3GPP Standard, pp. 1-17, Dec. 10, 2009.

Alexiou, A. et al., "MBMS Multicast Mode of UMTS," Retrieved from the Internet URL: http://ru6.cti.gr/ru6/publications/2148HCNDS2007_MBMS_Bouras.pdf on Jul. 21, 2014, pp. 1-33.

Ericsson et al., "MBMS Interest Indication for connected UEs," 3GPP Draft, R2-116190, 3rd Generation Partnership Project (3GPP), Mobile Competence Centre, vol. RAN WG2, No. San Francisco, USA, pp. 20111110-20111114, Nov. 8, 2011.

Final Office Action mailed Apr. 15, 2013 in U.S. Appl. No. 12/981,226, Peter M. Drotz et al., filed Dec. 29, 2010.

Final Office Action mailed Apr. 25, 2013 in U.S. Appl. No. 12/981,323, Michael F. Korus, filed Dec. 29, 2010.

Final Office Action mailed Sep. 23, 2013 in U.S. Appl. No. 12/981,274, Michael F. Korus, filed Dec. 29, 2010.

Hartung, F. et al., "MBMS—IP Multicast/Broadcast in 3G Networks," International Journal of Digital Multimedia Broadcasting, vol. 2009, (2009) Article ID 597848, pp. 1-25.

Huawei, "Stage 2 agreements on service continuity and location information for MBMS for LTE," 3GPP Draft, R2-115596, 3rd Generation Partnership Project (3GPP), Mobile Competence Centre, vol. RAN WG2, No. Zhuhai; 20111010, Oct. 26, 2011.

International Search Report and Written Opinion for counterpart International Patent Application No. PCT/US2011/066705 mailed on Jan. 18, 2013.

International Search Report and Written Opinion for counterpart International Patent Application No. PCT/US2012/053051 mailed on Nov. 26, 2012..

International Search Report for counterpart International Patent Application No. PCT/US2013/071828 mailed on May 13, 2014.

International Search Report for counterpart International Patent Application No. PCT/US2013/071837 mailed on May 13, 2014.

Non-Final Office Action mailed Mar. 1, 2013 in U.S. Appl. No. 12/981,274, Michael F. Korus et al., filed Dec. 29, 2010.

Non-Final Office Action mailed Apr. 17, 2014 in U.S. Appl. No. 13/231,530, Donald G. Newberg et al., filed Sep. 13, 2011.

Non-Final Office Action mailed Jun. 4, 2014 in U.S. Appl. No. 12/981,323, Michael F. Korus et al., filed Dec. 29, 2010.

Non-Final Office Action mailed Oct. 26, 2012 in U.S. Appl. No. 12/981,226, Peter M. Drotz et al., filed Dec. 29, 2010.

Non-Final Office Action mailed Oct. 26, 2012 in U.S. Appl. No. 12/981,323, Michael F. Korus, filed Dec. 29, 2010.

Notice of Allowance mailed May 21, 2014 in U.S. Appl. No. 13/724,098, Michael F. Korus et al., filed Dec. 21, 2012.

Open Mobile Alliance: "OMA PoC Control Plane Approved Version 1.0.3," OMA-TS-PoC_ControlPlane-V1_0_3-20090922-A, pp. 1-8, Sep. 22, 2009.

Open Mobile Alliance: "Poc User Plane Approved Version 1.0.3," OMA-TS-PoC_UserPlane-V1_0_3-20090922-A, pp. 1-12, Sep. 22, 2009.

Qualcomm Europe, "Qualcomm proposal for E-UTRAN Architecture and Protocols," 3GPP Draft, R2-052921, 3rd Generation Partnership Project (3GPP), Mobile Competence Centre, vol. RAN WG2, No. Seoul, Korea; 20051102, Nov. 2, 2005.

Rosenberg, J. et al., "SIP: Session Initiation Protocol," RFC 3261, Network Working Group Request for Comments, pp. 14, Jun. 1, 2002.

\* cited by examiner

METHOD AND APPARATUS FOR QUEUED ADMISSIONS CONTROL IN A WIRELESS COMMUNICATION SYSTEM

FIELD OF THE INVENTION

The present invention relates generally to wireless communication systems, and more specifically to queued admissions control in a wireless communication system.

BACKGROUND OF THE INVENTION

Resource management is a key component of mission critical Push-to-Talk (PTT) systems. There is an expectation that PTT systems can manage wireless resources and grant calls if the required resources are available and queue calls if the required resources are not. Further, there is an expectation that PTT communication should be available via broadband systems, such as a 3GPP (Third Generation Partnership Project) LTE (Long Term Evolution) communication system. In this environment, a call controller is no longer tightly coupled to a radio access network (RAN), making resource management more difficult. This is especially true when individual unicast bearers need to be established for each broadband subscriber.

Some broadband cellular radio systems, such as systems that operate pursuant to the 3GPP LTE and WiMAX (Institute of Electrical and Electronics Engineers (IEEE) 802.16) standards, use a Quality of Service (QoS) resource management approach in which a request for establishment of a Guaranteed Bitrate (GBR) bearer in a cell is either admitted or denied. However, the standards do not provide a capability for maintaining a queue of pending requests for radio frequency (RF) channel resources, instead providing that blocked calls are cleared from the system. This "Blocked Calls Cleared" (Erlang-B) approach is generally adequate for handling telephone calls. A call establishment request which occurs when no resources are available is provided a "fast busy signal," which is also known as a "reorder" indication. By contrast, a PTT voice call establishment request in a trunked radio system, when no resources are available, has traditionally been placed in a queue of pending requests. This is referred to as a "Blocked Calls Queued" (Erlang-C) approach. Further, 3GPP LTE manages resource congestion by using an Allocation and Retention Priority (ARP) preemption mechanism, which allows a higher priority call to preempt an existing lower priority call. However, such preemption may be more objectionable to end users than would incurring extra delay while the call is being established.

It is difficult to add queuing functionality for blocked calls to a standard 3GPP LTE cellular system for several reasons. The 3GPP LTE cellular standards do not define a method which would allow an eNodeB base station to indicate when channel capacity has become available in one of its RF cells that could be used to establish a new GBR bearer. Further, there is the additional challenge that independent LTE Application Function (AF) network elements, using separate LTE Policy and Charging Rule Functions (PCRFs), could compete for resources in a single congested LTE cell. There is no standardized LTE protocol which would allow independent AFs to coordinate their resource requests so that a single common queue of pending requests for resources in a congested cell could be maintained.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
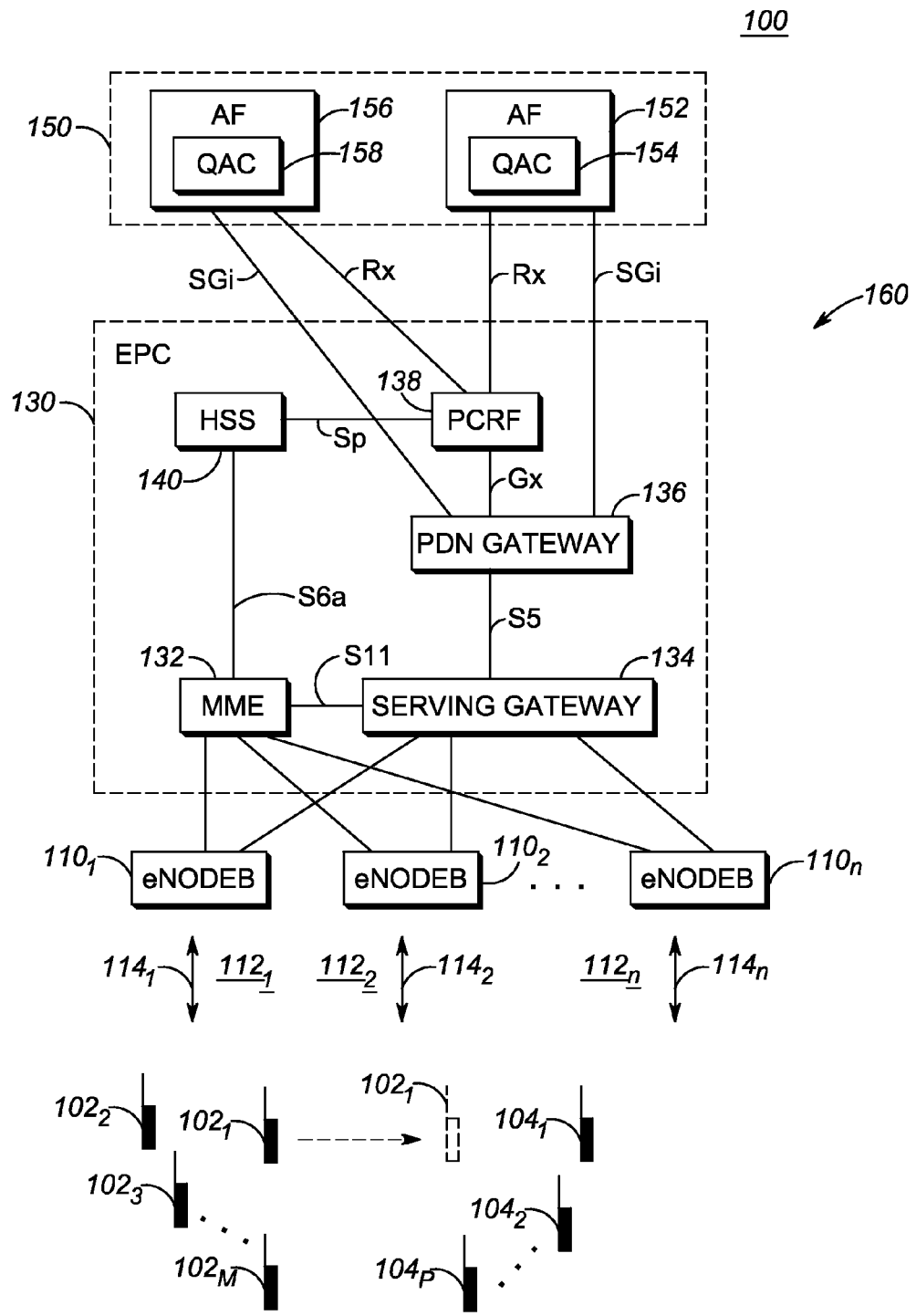
FIG. 1 is a block diagram of a wireless communication system in accordance with various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

To address the need that exists for coordination of resource requests, a method and services network element are provided that provide for queued admissions control in a wireless communication system by receiving a bearer establishment request associated with a user equipment, determining that a cell where the user equipment is located is congested, in response to determining that the cell is congested, creating a bearer establishment request record (BERR) associated with the user equipment and the bearer establishment request, wherein the BERR comprises priority information associated with the BERR, and adding the BERR to a queue, wherein the queue is associated with a cell serving the user equipment, wherein the BERR is positioned in the queue based on the priority information, and wherein bearer establishment requests associated with BERRs in the queue are submitted based on a position of the BERRs in the queue. Further, coordination of queued resource requests among multiple services network elements is provided.

Generally, an embodiment of the present invention encompasses a method for queued admissions control in a wireless communication system. The method includes receiving a bearer establishment request associated with a user equipment, determining that a cell where the user equipment is located is congested, in response to determining that the cell is congested, creating a bearer establishment request record (BERR) associated with the user equipment and the bearer establishment request, wherein the BERR comprises priority information associated with the BERR, and adding the BERR to a queue, wherein the queue is associated with a cell serving the user equipment, wherein the BERR is positioned in the queue based on the priority information, and wherein bearer establishment requests associated with BERRs in the queue are submitted based on a position of the BERRs in the queue.

Another embodiment of the present invention encompasses a services network element that provides for queued admissions control in a wireless communication system. The services network element includes a processor that is configured to receive a bearer establishment request associated with a user equipment, determine that a cell where the user equipment is located is congested, in response to determining that the cell is congested, create a bearer establishment request record (BERR) associated with the user equipment and the bearer establishment request, wherein the BERR comprises priority information associated with the BERR, and add the BERR to a queue, wherein the queue is associated with a cell serving the user equipment, wherein the BERR is positioned in the queue based on the priority information, and wherein bearer establishment requests associated with BERRs in the queue are submitted based on a position of the BERRs in the queue.

Yet another embodiment of the present invention encompasses an apparatus that provides for queued admissions control in a wireless communication system. The apparatus includes a first services network element that is configured to receive a bearer establishment request associated with a user equipment, determine that a cell where the user equipment is located is congested, in response to determining that the cell is congested, create a bearer establishment request record (BERR) associated with the user equipment and the bearer establishment request, wherein the BERR comprises priority information associated with the BERR, and add the BERR to a first queue, wherein the first queue is associated with a cell serving the user equipment, wherein the BERR is positioned in the first queue based on the priority information, and wherein channel capacity is allocated to BERRs in the first queue based on their position in the first queue. The first services network element further is configured to determine that the user equipment has moved to a new cell and, in response to determining that the user equipment has moved, transferring the bearer establishment request record (BERR) associated with the user equipment, along with the associated priority information, to a second services network element. The apparatus further includes a second services network element that is configured to maintain a BERR associated with another user equipment in a second queue, wherein the first queue and the second queue are for a same congested cell, wherein the first services network element and the second services network element are configured to operate the first queue and the second queue as a single virtual bearer establishment request queue that preserves a desired ordering of a set consisting of the union of the queued BERRs in the first and second queues.

Turning now to the drawings, the present invention may be more fully described with reference to FIGS. 1-9. FIG. 1 is a block diagram of a wireless communication system 100 in accordance with various embodiments of the present invention. Communication system 100 includes multiple wireless user equipment (UEs) $102_1$-$102_M$, $104_1$-$104_P$, for example but not limited to a cellular telephone, a radiotelephone, or a Personal Digital Assistant (PDA), personal computer (PC), or laptop computer equipped for wireless voice communications. Each UE $102_1$-$102_M$, $104_1$-$104_P$ includes one or more application layer clients which communicate with a corresponding element 152, 156 of a services network 150 via an intervening Evolved Packet Core 130 of an infrastructure, 160 of communication system 100.

More particularly, infrastructure 160 of communication system 100 includes an access network comprising multiple eNodeBs $110_1$-$110_n$ that each provides wireless communication services to users equipment (UEs) located in a corresponding cell $112_1$-$112_n$ via a corresponding air interface $114_1$-$114_n$. For example, as depicted in FIG. 1, UEs $102_1$-$102_M$ reside in cell $112_1$ and are served by eNodeB $110_1$ and UEs $104_1$-$104_P$ reside in cell $112_2$ and are served by eNodeB $110_2$. Each air interface $114_1$-$114_n$ includes a forward link that includes multiple traffic channels, that is, bearers, and forward link common and dedicated signaling channels. Each air interface $114_1$-$114_n$ further includes a reverse link that includes multiple traffic channels, that is, bearers, and reverse link common and dedicated signaling channels. Although in this figure an eNodeB is associated with a single cell, in alternative configurations a single eNodeB may be associated with several adjacent cells, typically three.

Infrastructure 160 of communication system 100 further includes an Evolved Packet Core (EPC) 130 residing between the access network and a services network 150. EPC 130 includes a Mobility Management Entity (MME) 132, multiple gateways 134, 136, such as a Serving Gateway 134 and a Public Data Network Gateway (PDN GW) 136, a Policy Control and Charging Rules Function (PCRF) 138, and a Home Subscriber Server (HSS) 140. Each eNodeB $110_1$-$110_n$ is coupled to MME 132 via an 'S1-MME' interface and to Serving Gateway 134 via an 'S1-U' interface. In turn, Serving Gateway 134 is coupled to PDN Gateway via an 'S5' interface and to MME 132 via an 'S11' interface. MME 134 further is coupled to HSS 140 via an 'S6a' interface, HSS 140 is coupled to PCRF 138 via an 'Sp' interface, and PCRF 138 is coupled to PDN Gateway 134 via a 'Gx' interface.

Services network 150 comprises one or more Application Servers (ASs) or other services network elements implementing an Application Function (AF) (collectively referred to herein as an AF) 152, 156 (two shown). Each AF 152, 156 may have a bearer connection with PDN Gateway 136 via an 'SGi' interface and have a signaling connection with PCRF 138 via an 'Rx' interface. From the perspective of the 3GPP (Third Generation Partnership Project) LTE (Long Term Evolution) standards regarding Evolved Packet Core 130, a network entity with which PCRF 138 communicates using the Rx protocol is considered to be an Application Function. In FIG. 1, each Application Server 152, 156 is also acting as an LTE Application Function. Further, each AF 152, 156 implements a corresponding Queued Admission Control (QAC) function 154 158 that controls a queuing of bearer establishment requests, for example, associated with Push-to-Talk (PTT) calls.

The above-listed interfaces are all known in the art and will not be described in greater detail herein. Furthermore, although single interfaces have been described herein between many of the network elements of communication system 100, each interconnection among elements may comprise multiple interconnections and/or interfaces, such as one or more of a signaling interface, for example, an interface for an exchange of SIP, ISUP, MAP, or Megaco messages, and a bearer interface or path, such a path for an exchange of voice information.

Figure 2:
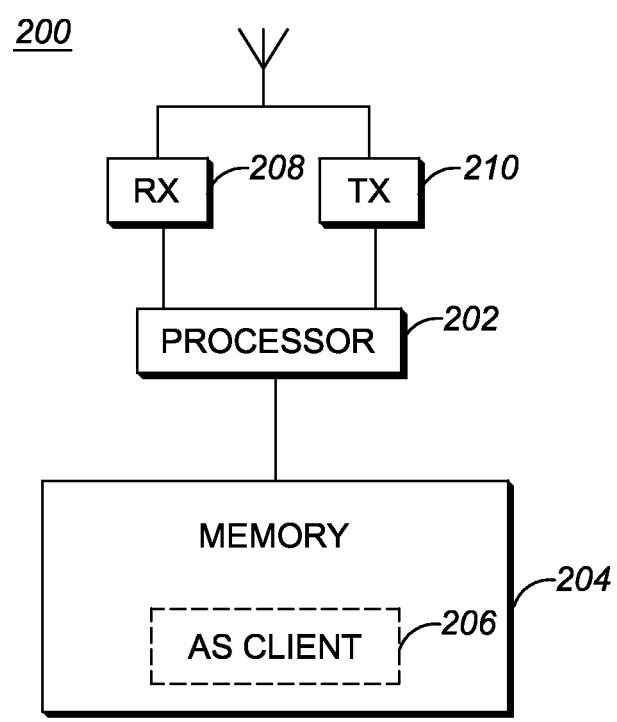
FIG. 2 is a block diagram of a user equipment of FIG. 1 in accordance with an embodiment of the present invention.
Figure 3:
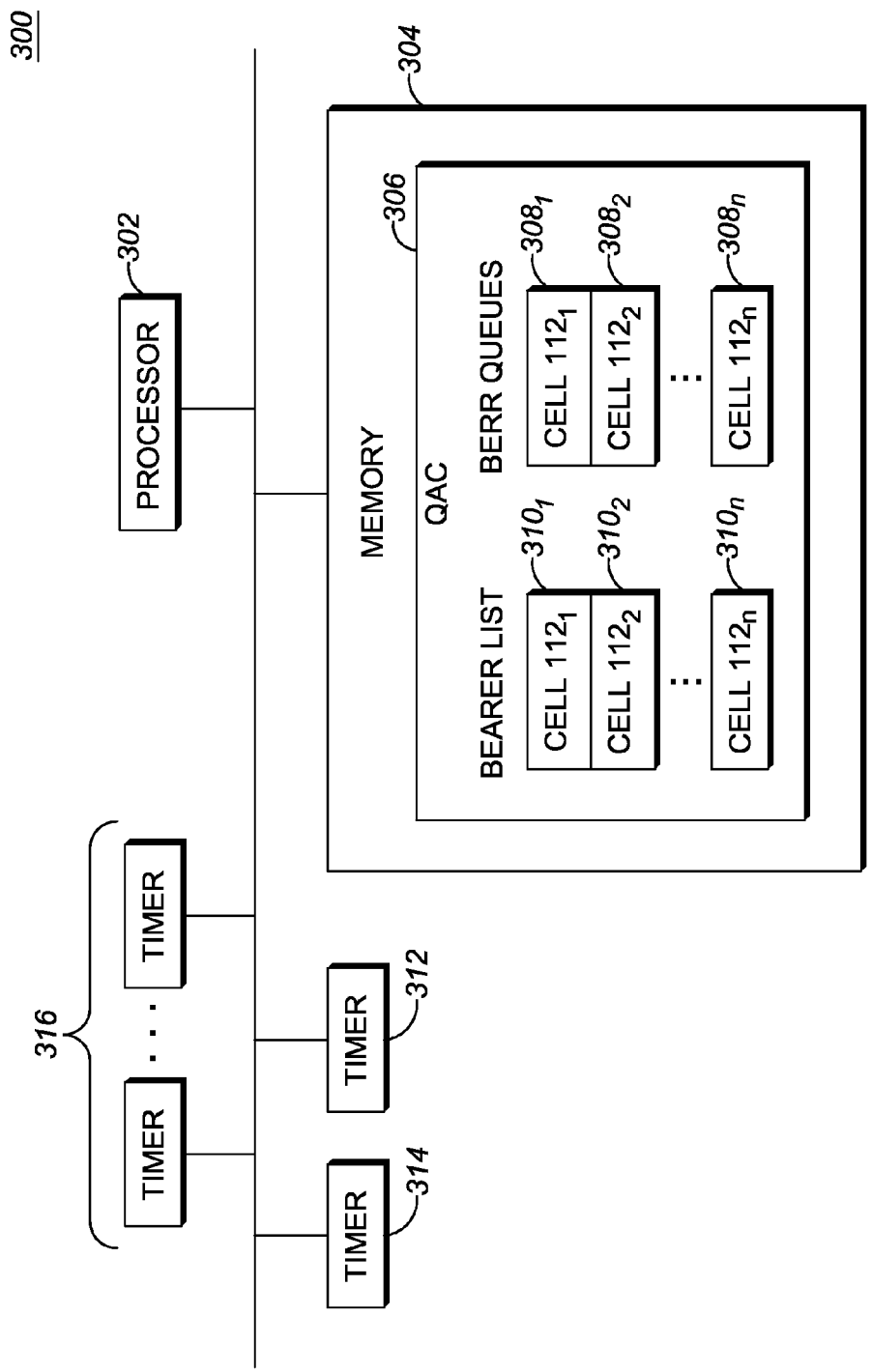
FIG. 3 is a block diagram of an application server of FIG. 1 in accordance with an embodiment of the present invention.

Referring now to FIGS. 2 and 3, block diagrams are provided of a UE 200, such as UEs $102_1$-$102_M$ and $104_1$-$104_P$, and of an AF 300, such as AFs 152 and 156, in accordance with various embodiments of the present invention. Each of UE 200 and AF 300 includes a respective processor 202, 302, such as one or more microprocessors, microcontrollers, digital signal processors (DSPs), combinations thereof or such other devices known to those having ordinary skill in the art, which processor is configured to execute the functions described herein as being executed by the UE and AF. Each of UE 200 and AF 300 further includes a respective at least one memory device 204, 304, such as random access memory (RAM), dynamic random access memory (DRAM), and/or read only memory (ROM) or equivalents thereof, that is coupled to the processor and that maintains data and programs/instructions that may be executed by the associated processor and that allows the UE and AF to perform all functions necessary to operate in communication system 100.

At least one memory device 204 of UE 200 further maintains one or more application layer clients 206 (one shown) that, when executed by processor 202, communicates with a corresponding application executed by an AF, such as AFs 152 and 156. For example and with reference to FIG. 4, the one or more application layer clients 206 may include a Priority Manager (PM) client that would communicate with a PM 406 and/or a PTT client that would communicate with PTT AS 402. UE 200 further includes a radio frequency (RF) receiver 208 and an RF transmitter 210 capable of exchanging wireless messaging with each of eNodeBs $110_1$-$110_n$.

AF 300 further maintains, in the corresponding at least one memory device 304 of the AF, a QAC function 306, such as QAC functions 154 and 158, which QAC function is executed by the processor 302 of AF 300 and that performs queue-based QAC. QAC function 306 maintains multiple queues $308_1$-$308_n$ of bearer establishment request records (BERRs), wherein each such queue (also referred to herein a BERR queues) is associated with a corresponding cell $112_1$-$112_n$ served by the AF. In various embodiments of the present invention, cells $112_1$-$112_n$ may be of a single geographical region or of multiple geographical regions. When AF 300 services multiple geographical regions and comprises multiple QAC functions where each is associated with cells of a region of the multiple geographical regions, a QAC function used to establish a bearer for a UE may be selected by the AF based on a geographical region, of multiple geographical regions, where the UE's cell is located. In still other embodiments of the present invention, a cell of a UE may be unknown and a BERR associated with the UE may be maintained in a BERR queue that contains only this BERR and is not associated with any cell at all. In this event, an associated bearer establishment request would be resubmitted based on an expiration of a resubmission timer as described herein.

The queues $308_1$-$308_n$ may be implemented as priority queues, which are well known in the field of computer science. More particularly, each bearer establishment request queue $308_1$-$308_n$ maintains a set of records of bearer establishment requests, which are ordered within a queue based on one or more of the parameters associated with each such record/request and which requests are associated with UEs served by the corresponding cell $112_1$-$112_n$ whose requests could not be granted at the time the request was received by the QAC function, for example, due to a lack of available bearers in the cell. Parameters which may be considered to determine the ordering of requests within the queue include but are not limited to a combination of queuing priority parameter associated with a request, an LTE Allocation and Retention Priority (ARP) of a request, and a time at which the request was submitted to the queue. Thus, the bearer establishment request records (BERRs) maintained in each queue $308_1$-$308_n$ are available to AF 300 for subsequent bearer establishment request grant reconsideration. In one embodiment of the present invention, a queue $308_1$-$308_n$ may be temporary, that is, may be established when a first such bearer establishment request is received and may be terminated when no further bearer establishment requests remain queued. The queue then may be re-established when a subsequent such bearer establishment request is received. In another embodiment of the present invention, the queues $308_1$-$308_n$ may be pre-programmed into the AF 300 and may be populated when such bearer establishment request are received, and emptied as such bearer establishment requests are granted or terminated.

QAC function 306 further maintains multiple bearer lists $310_1$-$310_n$, wherein each list $310_1$-$310_n$ is associated with a corresponding eNodeB $110_1$-$110_n$ or cell $112_1$-$112_n$ served by the AF and wherein each list $310_1$-$310_n$ comprises identifiers of bearers that are currently allocated channel capacity in the cell. Similar to queues $308_1$-$308_n$, each list $310_1$-$310_n$ may be temporary, that is, may be established when a first such bearer establishment request is granted and may be terminated when no further bearers remain allocated at that eNodeB/cell. The list then may be re-established when a subsequent bearer establishment request is granted. In another embodiment of the present invention, the lists $310_1$-$310_n$ may be pre-programmed into the AF 300 and may be populated when such bearer establishment requests are granted, and emptied as such bearers are released.

Figure 4:
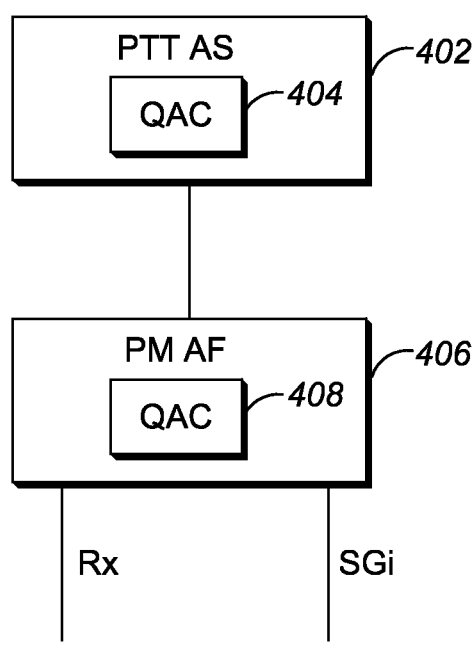
FIG. 4 is a block diagram depicting an application layer of the communication system of FIG. 1 including multiple application servers in accordance with another embodiment of the present invention.

In various embodiments of the present invention, and referring now to FIG. 4, an AF 300 may comprise an AF, an AS, or both an AF and an AS, for example, an AS such as a Push-to-Talk (PTT) server 402 in communication with a network element, such as another server, implementing an AF such as a Priority Manager (PM) 406, one or more of which may include a corresponding QAC function 404, 408. In the preferred embodiment, the QAC function is located in only one of these entities and not simultaneously in both.

Referring again to FIG. 3, AF 300 further includes multiple timers 312, 314, 316 that are coupled to processor 302 or that may be implemented by processor 302 based on data and instructions maintained in at least one memory device 304. A first timer 312 of the multiple timers may be a bearer establishment timer that counts down a first time period that is associated with an establishment of a bearer. A second timer 314 of the multiple timers may be a bearer establishment request resubmission timer that counts down a second time period that is associated with a resubmission of bearer establishment request, which time period is based on a bearer establishment request retry rate maintained by QAC function 306. A third one or more timers 316 of the multiple timers 312, 316 are queue timers that each counts down a third time period associated with a queued time of a corresponding bearer establishment request or BERR, and more particularly counts down a total time that the BERR has been queued in one or more of bearer establishment request queues $308_1$-$308_n$. That is, each bearer establishment request/BERR may be associated with a queue timer of the set of queue timers 316, which queue timer counts down a total time that the BERR has been queued, in one or multiple queues. Upon expiration of a queue timer associated with a bearer establishment request/BERR, the BERR corresponding to the bearer establishment request is deleted from whatever queue $308_1$-$308_n$ it resides in. In response to deleting the BERR, AF 300 may notify a device/application sourcing the corresponding bearer establishment request of the dropping of the request.

The functionality described herein as being performed by UE 200 and AF 300 is implemented with or in software programs and instructions stored in the respective at least one memory device 204, 304 associated with the UE and AF and executed by a processor 202, 302 associated with the UE and AF. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the UE, IMS core network gateway, and application server. Based on the present disclosure, one skilled in the art will be readily capable of producing and implementing such software and/or hardware without undo experimentation.

In order for a UE, such as UEs $102_1$-$102_M$ and $104_1$-$104_P$, to engage in a communication session via an eNodeB, such as eNodeBs $110_1$-$110_n$, each of UEs $102_1$-$102_M$ and $104_1$-$104_P$ and network 160 operates in accordance with known wireless telecommunications protocols. Communication system 100, as illustrated herein, is a Third Generation Partnership Project (3GPP) Long Term Evolution (LTE) communication system that provides packet data communication services to UEs serviced by network 160; however, other applicable packet data networks include but are not limited to a 3GPP2 communication system or derivatives of a 3GPP2 communication system, WiMAX packet data networks, and packet data networks that operate in accordance with the IEEE (Institute of Electrical and Electronics Engineers) 802.xx standards, for example, the 802.11, 802.15, or 802.16 or 802.20 standards. To ensure compatibility, radio system parameters and call processing procedures are specified by the standards, including call processing steps that are executed by an UE and an access network serving the UE and between the access network and associated elements of the infrastructure.

Communication system 100 provides for implementation of a QAC function, or capability, 306 in a services network connected to a 3GPP LTE (or similar) radio system. The approaches described assume that information regarding the cell in which a UE, such as UE 102, is located is available to the AF QAC function with which it is associated. More particularly, communication system 100 provides for a QAC function 154, 158, for example, in a network element identified as an "Application Function" (AF) within the LTE standards. For example, FIG. 4. depicts two locations in which the QAC function could be located; either in PTT Application Server 402 as QAC function 404, or alternatively, in Priority Manager Application Function 406 as QAC 408. If implemented in Priority Manager Application Function 406, the QAC function may act as an intermediary between one or more user application servers making bearer establishment requests and an LTE PCRF, such as PCRF 138. In this case, the QAC function in the Priority Manager Application Function 406 would need to determine an identifier of a cell (for example, a cell identifier (ID)) of the UE to which the bearer is to be established.

In one embodiment of the present invention, communication system 100 provides for a AF comprising a combined PTT AS and PM AF (AF) 152, 156 to obtain an identifier of a cell where UE 102 is located via extensions to the Rx interface, that is, to the communication protocol implementing the Rx interface between the AF and PCRF 138 allowing the AF to access the UE's location information maintained by, or accessible by, the PCRF. In another embodiment of the present invention, communication system 100 provides for AF 152, 156 to obtain an identifier of a cell where UE 102 is located directly from a client function implemented by the UE, which client function would report the UE's cell identifier, for example, cell ID, back to QAC function 154, 158 in the AF. For example, this might be done via an enhancement to the Motorola Solution, Inc., Public Safety LTE product's Priority Manager (PM) to PM-Client protocol. In the latter instance, the PM, which implements a role of an LTE AF, may implement the QAC function.

In response to receiving a bearer establishment request associated with a communication session, such as a Push-to-Talk (PTT) call, when the request cannot be granted, QAC function 154, 158 determines the cell where the UE is located and creates and queues, in a queue $308_1$-$308_n$ associated with that cell, a bearer establishment request record (BERR). The BERR includes the information that is included in the bearer establishment request, for example, identifiers of the source/UE/application associated with the request and bearer-type information, and further includes a priority of the request. QAC function 154, 158 then may request channel capacity, as it becomes available, using bearer establishment requests based on the position of the corresponding BERR in the queue. Thus, QAC function 154, 158 provides for prioritization of access to channel resources by a queuing of requests.

Figure 5A:
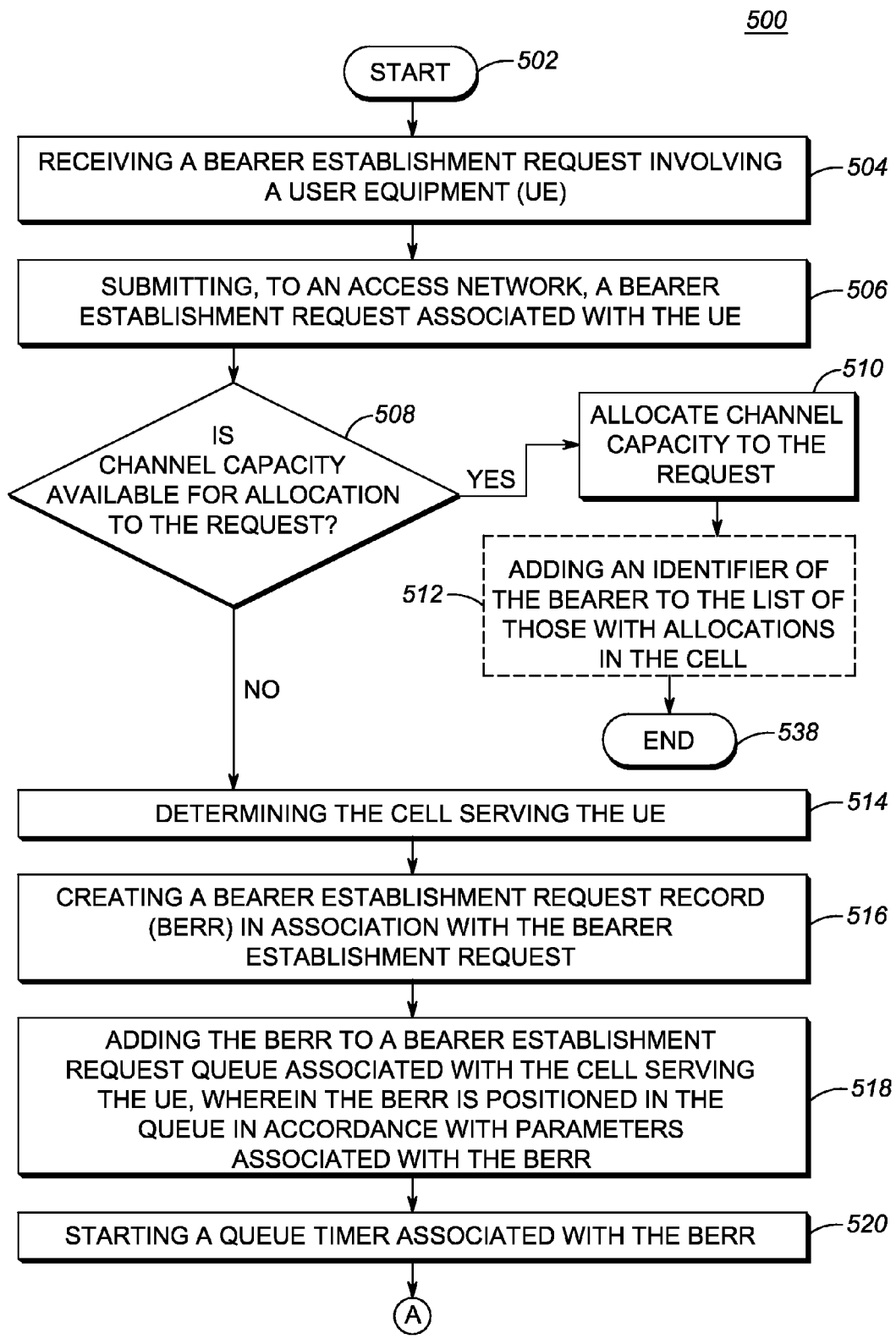
FIG. 5A is a logic flow diagram of a method executed by the communication system of FIG. 1 in queuing a bearer establishment request in accordance with some embodiments of the present invention.
Figure 5B:
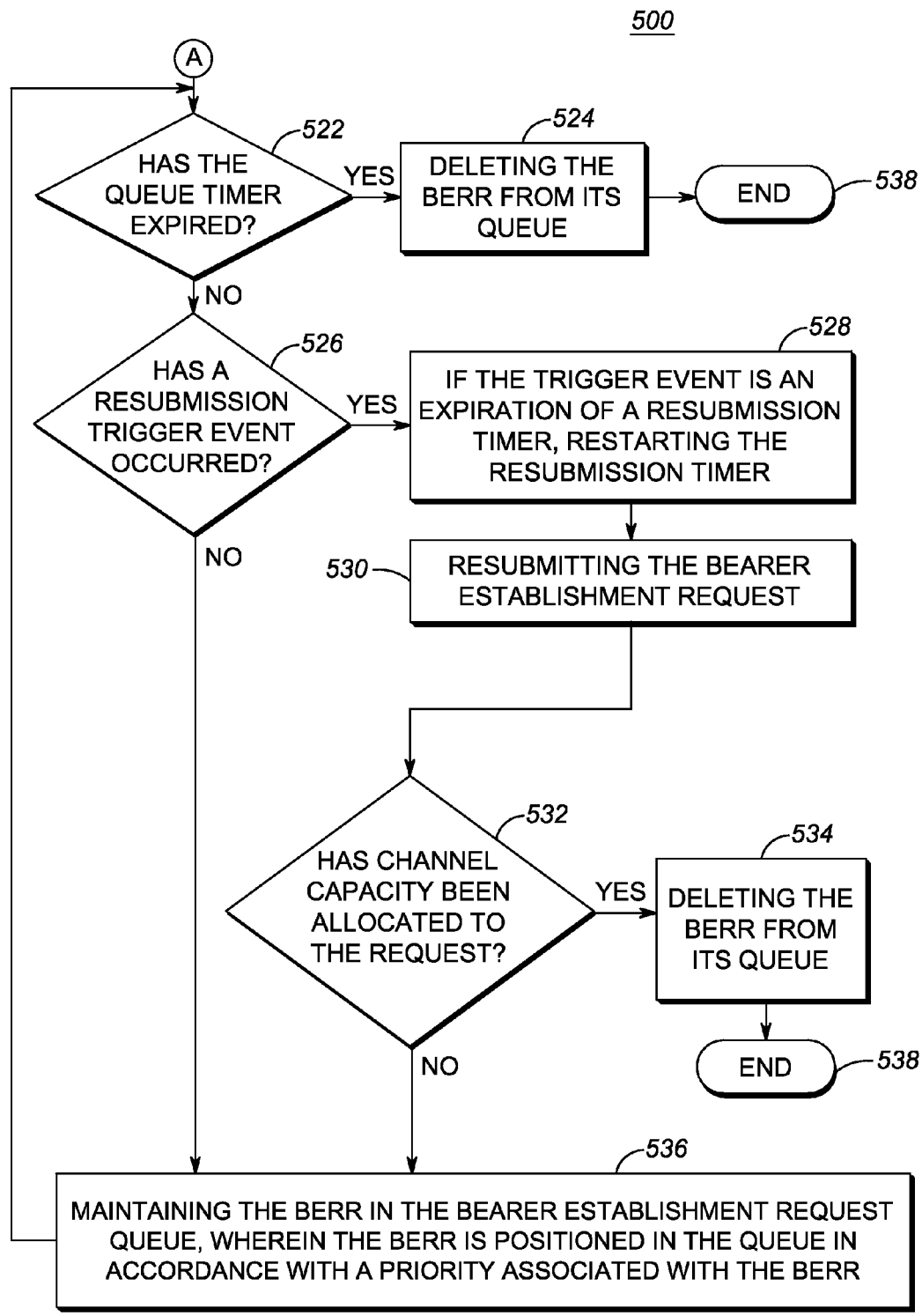
FIG. 5B is a continuation of the logic flow diagram of FIG. 5A illustrating a method executed by the communication system of FIG. 1 in queuing a bearer establishment request in accordance with some embodiments of the present invention.

Referring now to FIGS. 5A and 5B, a logic flow diagram 500 is provided that illustrates a method performed by communication system 100 in queuing a bearer establishment request record (BERR) in accordance with various embodiments of the present invention. Logic flow diagram 500 begins (502) when a QAC function, such as QAC function 154, implemented at an AF, that is, AF 152, that is outside of EPC 130, receives (504) a bearer establishment request associated with a communication session involving a UE, such as UE $102_1$. While logic flow diagram 500 is described with reference to a particular UE, AF, and QAC function, that is, UE $102_1$, AF 152, and QAC function 154, among other elements of communication system 100, one of ordinary skill in the art realizes that the method applies to any of the multiple UEs $102_1$-$102_M$ and $104_1$-$104_P$ of communication system 100 and to any QAC function implemented by an AF or AS, such as QAC functions 158 implemented by AF 156, or one of QAC functions 404 and 408 implemented by AS 402 or AF 406, respectively.

In various embodiments of the present invention, QAC function 154 may receive the request from the associated UE, that is, UE $102_1$, or from an application running on AF 152. The bearer establishment request includes an identifier of the UE, such as a subscriber unit identifier (SUID), an International Mobile Subscriber Identifier (IMSI), a mobile equipment identifier (MEID), or any other identifier known in the art that may be used to identify a UE, and further includes application-related information as known in the art, such as a Quality of Service (QoS) request by the application.

In response to receiving the bearer establishment request, QAC function 154 forwards the bearer establishment request to PCRF 138 and the PCRF determines one or more bearer parameters associated with the request, such as Quality of Service (QoS) parameters (for example, Allocation and Retention Priority (ARP), Guaranteed Bit Rate (GBR) v. non-GBR, Maximum Bit Rate (MBR), and QoS Class Identifier (QCI)) associated with the bearers that will be allocated to the session. PCRF 138 then provides this information, along with the bearer establishment request, to PDN GW 136 and the PDN GW initiates a procedure to set up the requested bearers by conveying a request to MME 132 to set up one or more associated bearers. In response to receiving the bearer establishment request from PDN GW 136, MME 138 conveys (506) a bearer setup request or a bearer reservation request to the eNodeB serving UE $102_1$, that is, eNodeB $110_1$.

When eNodeB $110_1$ receives the bearer setup request or the bearer reservation request, the eNodeB determines (508) whether channel capacity is available for allocation to a bearer allocation request, for example, whether there is available, unallocated channel capacity in a cell, for example, cell $112_1$, in which UE $102_1$ is located, such that a radio bearer can be allocated to fill the bearer establishment request of the communication session. That is, the cell may be determined to be congested (and, correspondingly, there being a lack of available, unallocated channel capacity at the cell) when a lack of available channel capacity prevents a radio bearer from being established to fill the bearer establishment request.

When eNodeB $110_1$ determines (508) that channel capacity is available for the bearer establishment request, the eNodeB allocates (510) the requested channel capacity to fill the request. This triggers signaling which causes the UE associated with the request, that is, UE 102 (which may have requested bearer establishment via the QAC function) to be notified. In one embodiment of the present invention, in response to allocating channel capacity to the bearer establishment request, eNodeB $110_1$ also may generate a signaling message which causes AF 152 to be informed of the bearer establishment, and thereby QAC function 154 is informed of the allocated bearer. In another embodiment of the present invention, in response to receiving the bearer setup request/bearer reservation request, eNodeB $110_1$ may only inform AF 152 when a bearer cannot be allocated (as opposed to when a bearer can be allocated), for example, by conveying a negative acknowledgement (NACK) of the bearer establishment request back to the AF. In such an embodiment, in response to conveying the bearer establishment request to PCRF 138, AF 152, and in particular QAC function 154, may start a bearer establishment timer 312, which timer counts down a predetermined time period associated with bearer establishment. When bearer establishment timer 312 expires prior to AF 152 receiving information that the requested bearer cannot be allocated, for example, prior to receiving a NACK, the AF, that is, QAC function 154, assumes that a bearer has been allocated. Optionally, in response to determining, by being informed or by assuming, that the eNodeB, that is, eNodeB $110_1$, has granted, or allocated, channel capacity to the bearer establishment request involving UE $102_1$, AF 152 may add (512) an identifier of the UE, that is, UE $102_1$, to the appropriate bearer list $310_1$-$310_n$, associated with cell $112_1$, that is, bearer list $310_1$. The bearer lists $310_1$-$310_n$ are per cell lists of bearers which have been established via the QAC mechanism in each cell. Logic flow 500 then ends (538).

When eNodeB $110_1$ determines (508) that channel capacity is not available for allocation to the request, the eNodeB so informs MME 132, which MME in turn informs PDN GW 136 that channel capacity is not available for the bearer establishment request. In response to being informed that channel capacity is not available, PDN GW 136 notifies PCRF 138 that channel capacity is not available for the bearer request and the PCRF, in turn, notifies AF 152 of the same. Again, in various embodiments of the present invention, the notification that channel capacity is not available may comprise a NACK, as disclosed above, or may be an event notification as known in the art.

In various other embodiments of the present invention, the determination that that channel capacity is not available may be performed by QAC function 154, for example, in response to receiving an indication that a cell is congested, for example, from a message sourced by a UE in the cell. For example, if the QAC function 154 maintains a populated BERR queue in association with the cell, then the QAC function can determine that the cell is congested. Or QAC function 154 may determine that one or more cells are congested (again, for example, by receiving an indication from a UE) and transmit an announcement identifying the congested cells, for example, transmitting a list of congested cells when there is more than one. A UE then may report an indication of its location to the QAC function when, in response to receiving the transmission, the UE determines that the UE is in, or is entering, the one or more congested cells.

In various embodiments of the present invention, the bearer setup request, bearer reservation request, or bearer establishment request be associated with a Guaranteed Bit Rate (GBR) bearer and the eNodeB or QAC function may determine whether the cell is congested based on whether uplink capacity, downlink capacity, or both uplink and downlink capacity, which are specified in the request, can be granted to the request due to a lack of available capacity in the uplink and/or downlink channel. For example, QAC function 306 may maintain separate BERR queues for requests that require only uplink capacity or only downlink capacity.

In response to being informed or self-determining that channel capacity is not available for the bearer establishment request, AF 152, and in particular QAC function 154, determines (514) the corresponding cell serving UE $102_1$, that is, cell $112_1$. In one such embodiment of the present invention, in response to being informed that channel capacity is not available for the bearer establishment request, AF 152 may query PCRF 138, via the Rx interface, for the identity of the eNodeB and cell serving UE $102_1$. In response to receiving the query from AF 152, PCRF 138 may retrieve, from HSS 140 and in the event that the PCRF does not already maintain such information, an identifier of a cell which serves UE $102_1$, that is, cell $112_1$, and provides the maintained/retrieved cell identifier to AF 152. For example, the cell identifier may comprise one or more of a Physical Cell Identifier (PCI), a Target Cell Identifier (TCI), and a E-UTRAN Cell Global Identifier (ECGI). PCRF 138 then provides the retrieved cell identifier to AF 152 via an enhanced version of the Rx interface.

In another such embodiment of the present invention, the notification that channel capacity is not available may include an identifier associated with the cell serving UE $102_1$, that is, cell $112_1$. For example, MME 132 may identify cell $112_1$ when informing PDN GW 136 that channel capacity is not available, and the PDN GW then informs PCRF 138, and the PCRF in turn informs AF 152, of the identity of the serving cell.

In response to determining the cell serving UE 102, AF 152, and in particular QAC function 154, creates (516) a bearer establishment request record (BERR) associated with the bearer establishment request and UE $102_1$ and adds (518) the BERR to a bearer establishment request queue $308_1$ maintained by the QAC function and associated with the identified cell, that is, cell $112_1$. For example and as described above, the BERR includes the information that is included in the bearer establishment request, for example, identifiers of the source/UE/application associated with the request and bearer-type information, and further may include priority information associated with the bearer establishment request, for example, a time that the request and/or BERR is created and/or added to a bearer establishment request queue, a service prioritization associated with the request, such as a QoS associated with the bearer establishment request or a priority of the application associated with the request (for example, a public safety or emergency responder application would have a higher priority than a standard user application), and/or an LTE Allocation and Retention (ARP) priority. BERRs are positioned in bearer establishment request queues $308_1$-$308_n$ to provide a queue ordering which is based on one or more of the parameters associated with the request. Channel capacity, as it becomes available at an eNodeB/cell as described below, is allocated to BERRs in a corresponding bearer establishment request queue based on each BERR's position in the queue, for example, first to the BERR at the top (head) of the queue, then to the BERR that is next in line in the queue, and so on. In one embodiment, when a bearer needs to be established for a UE in a particular cell and the bearer establishment request queue for that cell is not empty, the BERR of the new request is entered into the queue in an appropriate location and does not cause a bearer establishment request to be submitted to the eNodeB ahead of higher priority requests which are already waiting in the queue. Some of the benefit of this approach may be obtained by using another approach in which a new bearer establishment request is only entered into the appropriate per cell queue if its initial request fails to obtain resources. However, this latter approach does not provide priority ordering as reliably as the former approach.

Figure 6:
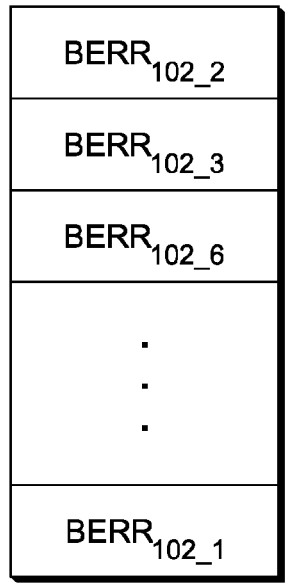
FIG. 6 is a block diagram of an exemplary bearer establishment request queue in accordance with an embodiment of the present invention.

In one embodiment of the present invention, the position of a BERR in a bearer establishment request queue may be based on an age of the BERR, wherein the older the bearer establishment request, the closer the BERR is to the top of the queue. That is, in such an embodiment, a BERR at the top of the queue would be the oldest (in time) BERR and a BERR at the bottom (tail) of the queue would be the newest (in time) BERR. For example and referring now to FIG. 6, an exemplary block diagram is provided of bearer establishment request queue $308_1$. As depicted in FIG. 6, one or more of the UEs served by cell $112_1$, that is, UEs $102_1$-$102_M$, has a corresponding bearer establishment request (BERR) stored in bearer establishment request queue $308_1$, wherein $BERR_{102\_1}$ represents a bearer establishment request record associated with UE $102_1$, $BERR_{102\_2}$ represents a bearer establishment request record associated with UE $102_2$, $BERR_{102\_3}$ represents a bearer establishment request record associated with UE $102_3$, and so on. As depicted in FIG. 6, since the bearer establishment request record associated with UE $102_1$, that is, $BERR_{102\_1}$, is the newest bearer establishment request record in bearer establishment request queue $308_1$, $BERR_{102\_1}$ is positioned at the bottom of the bearer establishment request queue and since the bearer establishment request record associated with UE $102_2$, that is, $BERR_{102\_2}$, is the oldest bearer establishment request record in bearer establishment request queue $308_1$, $BERR_{102\_2}$ is positioned at the top of the bearer establishment request queue.

By way of another example, in another embodiment of the present invention, a position of a BERR in a bearer establishment request queue may be based on one or more QoS parameters associated with the corresponding bearer establishment request and/or a prioritization of a service, or application, associated with the bearer establishment request. That is, a BERR positioned at the top of the queue would be the BERR associated with a highest associated QoS or a highest priority service or application, and a BERR positioned at the bottom of the queue would be the BERR associated with a lowest associated QoS or a lowest priority service or application. For example and referring now to FIG. 7, an exemplary block diagram illustration is provided of bearer establishment request queue $308_1$ wherein a position of a BERR in the bearer establishment request queue is based on QoS, service, or application, prioritization. Similar to FIG. 6, in FIG. 7 one or more of the UEs served by cell $112_1$, that is, UEs $102_1$-$102_M$, has a corresponding BERR stored in bearer establishment request queue $308_1$, wherein $BERR_{102\_1}$ represents a bearer establishment request record associated with UE $102_1$, $BERR_{102\_2}$ represents a bearer establishment request record associated with UE $102_2$, $BERR_{102\_3}$ represents a bearer establishment request record associated with UE $102_3$, and so on. Note that this and other examples in this document show the case in which a single UE has only a single BERR in the queue, but this approach does not preclude the case in which a single UE has submitted multiple bearer establishment requests that are simultaneously queued.

Figure 7:
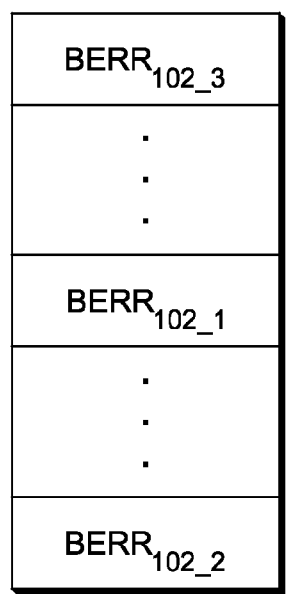
FIG. 7 is a block diagram of an exemplary bearer establishment request queue in accordance with another embodiment of the present invention.

As depicted in FIG. 7, since the bearer establishment request record associated with UE $102_1$, that is, $BERR_{102\_1}$, is associated with a higher QoS or a higher priority service/application, than a bearer establishment request associated with UE $102_2$, that is, $BERR_{102\_2}$, $BERR_{102\_1}$ is positioned higher in bearer establishment request queue $308_1$ than $BERR_{102\_2}$ even though $BERR_{102\_1}$ may be newer than $BERR_{102\_2}$. On the other hand, since $BERR_{102\_1}$ is associated with a lower QoS, or a lower priority service/application than a bearer establishment request associated with UE $102_3$, that is, $BERR_{102\_3}$, $BERR_{102\_1}$ is positioned lower in bearer establishment request queue $308_1$ than $BERR_{102\_3}$ even though $BERR_{102\_1}$ may be older than $BERR_{102\_3}$.

While FIGS. 6 and 7 depict two possible schemes that may be used to position BERRs in a bearer establishment request queue, the scheme used to position BERRs in a queue is up to a designer of communication system 100 and nearly an unlimited number of different prioritization schemes are possible, as any prioritization parameter(s) and/or positioning algorithm utilizing a combination of prioritization parameters may be used herein as may occur to one of ordinary skill in the art.

Referring again to logic flow diagram 500, upon adding the BERR associated with UE $102_1$, that is, $BERR_{102\_1}$, to bearer establishment request queue $308_1$, QAC function 154 starts (520) a queue timer 316 that is associated with $BERR_{102\_1}$. The queue timer counts down a time period that the $BERR_{102\_1}$ has been queued in bearer establishment request queue $308_1$. As described above, upon expiration (522) of the queue timer 316 associated with $BERR_{102\_1}$, QAC function 154 deletes (524) $BERR_{102\_1}$ from bearer establishment request queue $308_1$.

Intermittently, for example, periodically or non-periodically, in response to an occurrence (526) of a resubmission trigger event, QAC function 154 resubmits (530), to a corresponding eNodeB, that is, eNodeB $110_1$, a bearer establishment request associated with a BERR at the top of the bearer establishment request queue, that is, bearer establishment request queue $308_1$, to PCRF 138 for bearer allocation. In response, the PCRF arranges for a resubmission of a corresponding bearer setup request or bearer reservation request to eNodeB $110_1$ via PDN GW 136 and MME 138.

For example, suppose $BERR_{102\_1}$ is at the top of bearer establishment request queue $308_1$. Intermittently, and assuming that the queue timer 316 associated with $BERR_{102\_1}$ has not expired (or else $BERR_{102\_1}$ would have been deleted from the queue), QAC function 154 resubmits a bearer establishment request associated with $BERR_{102\_1}$ by generating a bearer establishment request associated with the BERR and conveying the bearer establishment request to PCRF 138. In response to resubmitting the bearer establishment request, QAC function 154 then may defer deletion of $BERR_{102\_1}$ from bearer establishment request queue $308_1$ until confirming that bearers have been allocated to the bearer establishment request. If not included in the bearer establishment request, PCRF 138 may again determine one or more bearer parameters associated with the request, such as QoS parameters, and provide this information, along with the bearer establishment request, to PDN GW 136. In response to receiving the bearer establishment request, PDN GW 136 again initiates a procedure to set up the requested bearers by conveying a request to MME 132 to set up the request bearers. In response to receiving the request from PDN GW 136, MME 138 then conveys a bearer setup request or a bearer reservation request to eNodeB $110_1$.

In one embodiment of the present invention, wherein QAC function 154 periodically automatically resubmits (530) a bearer establishment request in response to a trigger event comprising an expiration of a resubmission timer 314, QAC function 154 may restart (528) the resubmission timer each time the QAC function submits a bearer establishment request. Upon expiration of the resubmission timer, QAC function 154 resubmits (530) a bearer establishment request to eNodeB $110_1$ based on the bearer establishment request retry rate maintained by the QAC function. The retry rate may be static or may be dynamically determined based on a priority (for example, age, QoS parameters, or service/application priority) of the BERR at the top of the bearer establishment request queue. For example, bearer establishment requests that have a high priority could be retried more frequently than bearer establishment requests or the retry rate for a bearer establishment request could increase the longer the request is in the bearer establishment request queue.

In another embodiment of the present invention, instead of or in addition to periodically automatically resubmitting a bearer establishment request, a bearer establishment request may be resubmitted (530) in response to an occurrence (528) of a trigger event that may not be periodic, such as a determination, by the QAC function, that channel capacity is available for allocation to the bearer establishment request. For example, QAC function 154 may determine, at step 526, whether any UE in the bearer list $310_1$ has released channel capacity which had been assigned to one of its bearers in this cell and resubmit (530) a bearer establishment request if and when a UE in this cell (in the list $310_1$) releases channel capacity which would cause sufficient capacity to be available to meet the needs of the BERR at the top of the bearer establishment request queue, that is, bearer establishment request queue $308_1$. In such an embodiment, the determination of whether any bearer in the bearer list $310_1$ has released channel capacity in this cell may be made intermittently or periodically. In response to determining (526) that no channel capacity or insufficient channel capacity is currently available for allocation in this cell, the corresponding BERR, that is, $BERR_{102\_1}$, remains (536) on top of bearer establishment request queue $308_1$ and logic flow 500 then returns to step 522. In response to determining (526) that sufficient channel capacity is currently available for allocation in the cell, QAC function 154 resubmits (530) a bearer establishment request to eNodeB $110_1$ via EPC 130.

For example, QAC function 154 may determine, by reference to bearer lists $310_1$-$310_n$, that another UE, such as UE $102_2$, last served by a given eNodeB and cell, such as eNodeB $110_1$ and cell $112_1$, serving UE $102_1$, and which UE $102_2$ is currently allocated channel capacity at that eNodeB and cell, has one or more of been handed over to another cell or has relinquished its allocated channel capacity associated with a bearer. In various such embodiments, QAC function 154 may determine whether UE $102_2$ has been handed over by periodically querying PCRF 138 for a location of UE $102_2$, or by subscribing to an event package at the PCRF requesting to be informed when UE $102_2$ is handed over. In the former instance, PCRF 138, if the PCRF does not already maintain such information, may retrieve an identifier associated with the eNodeB/cell currently serving UE $102_2$ from HSS 160 and provide the maintained/retrieved eNodeB/cell identifier to AF 152. In other such embodiments, QAC function 154 may determine whether UE $102_2$ has relinquished its allocated channel capacity associated with a bearer by querying a corresponding server-based application in regard to whether the application is engaged in a communication session with the UE, or by receiving, from a client in the UE, a notification when the channel capacity associated with the bearer is released. In still another embodiment of the present invention, QAC function 154 may broadcast an announcement to UEs that includes a list of cells that are believed to be congested. A UE then would respond if it enters or exits a cell on that list. If a UE, such as UE $102_2$, exits such a cell and QAC function 154 determines, by reference to bearer lists $310_1$-$310_n$, that the UE is allocated channel capacity associated with a bearer in that cell, the QAC function may determine that channel capacity in that cell has, or is about to, free up and may resubmit a bearer establishment request stored in a bearer establishment request queue $308_1$-$308_n$ associated with that cell.

When, at step 530, QAC function 154 resubmits a bearer establishment request, eNodeB $110_1$, in response to receiving a corresponding bearer setup request or bearer reservation request, determines whether any channel capacity is available for allocation to the request.

When eNodeB $110_1$ determines that the requested channel capacity is not available in the cell for allocation to the request, the eNodeB so informs MME 132, which MME in turn informs PDN GW 136 that channel capacity is not available for assignment to the bearer establishment request. In response to being informed that channel capacity is not available, PDN GW 136 notifies PCRF 138 that channel capacity is not available for assignment to the bearer establishment request and the PCRF, in turn, notifies (532) AF 152 of the same. Assuming that the queue timer 316 associated with $BERR_{102\_1}$ has not expired, $BERR_{102\_1}$ remains (536) on top of bearer establishment request queue $308_1$ and logic flow 500 then returns to step 522.

When eNodeB $110_1$ determines that channel capacity is available for assignment to the bearer establishment request, the eNodeB allocates the requested channel capacity to the request and informs UE $102_1$ of the allocated bearer. In one such embodiment of the present invention, in response to allocating channel capacity to the bearer establishment request, eNodeB $110_1$ also may inform (532) AF 152 via the EPC 130, and thereby QAC function 154, of the assignment of channel capacity which caused successful bearer establishment and, in response, QAC function 154 deletes (534) the BERR from queue $308_1$, and the lower positioned BERRs are correspondingly moved up in the queue. In another such embodiment of the present invention, in response to receiving the bearer setup request/bearer reservation request, eNodeB $110_1$ may only inform AF 152 when a bearer cannot be established (as opposed to when a bearer can be established), for example, by conveying a negative acknowledgement (NACK) of the bearer establishment request back to the AF. In such an embodiment, in response to conveying the bearer establishment request to PCRF 138, AF 152, and in particular QAC function 154, may start a bearer establishment timer 312, which timer counts down a predetermined time period associated with bearer establishment. When bearer establishment timer 312 expires prior to AF 152 receiving information that the requested bearer cannot be established, for example, prior to receiving a NACK, the AF, that is, QAC function 154, assumes (532) that a bearer has been established and the corresponding requested channel capacity has been allocated. In response to determining that channel capacity has been assigned to the bearer establishment request involving UE 102, QAC function 154 then deletes (534) the BERR from queue $308_1$, and the lower positioned BERRs are correspondingly moved up in the queue. Logic flow 500 then ends (538).

In order to provide a feature of fairness for a UE that is handed off among eNodeBs/cells, so that a UE with a pending bearer establishment request record does not have to restart a waiting period every time it moves to a new eNodeB/cell, communication system 100 further provides for such a UE to transfer it's BERR, along with the priority of the BERR, to a bearer establishment request queue associated with the new eNodeB/cell.

Figure 8:
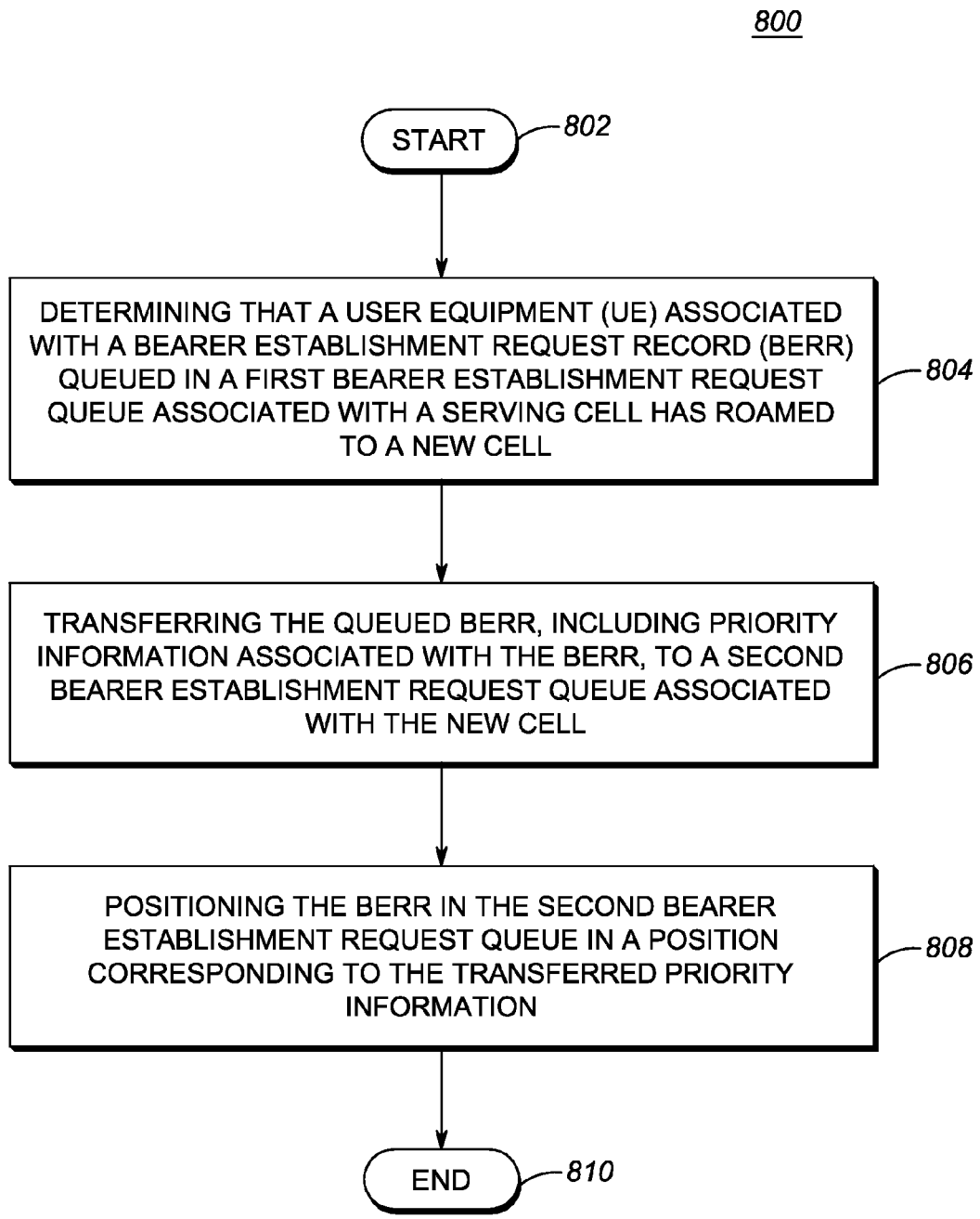
FIG. 8 is a logic flow diagram of a method executed by the communication system of FIG. 1 in transferring a bearer establishment request record between bearer establishment request queues in accordance with various embodiments of the present invention.

Referring now to FIG. 8, a logic flow diagram 800 is provided of method executed by communication system 100 in transferring a queued BERR between bearer establishment request queues in accordance with an embodiment of the present invention. Logic flow diagram 800 begins (802) when AF 152, and in particular QAC function 154, determines (804) that a UE, such as UE $102_1$, associated with a BERR that is queued in a first bearer establishment request queue associated with a serving cell, that is, bearer establishment request queue $308_1$ associated with cell $112_1$, has been handed over to a new cell, for example, to cell $112_2$. In one such embodiment, AF 152 may periodically query PCRF 138 for a location of UE 102 when the UE has a queued bearer establishment request. In response, PCRF 138, if the PCRF does not already maintain such information, retrieves an identifier associated with the cell currently serving UE $102_1$ from HSS 160 and provides the maintained/retrieved cell identifier to AF 152.

In response to determining that UE $102_1$ has roamed to a new cell, that is, from cell $112_1$ to cell $112_2$, QAC function 154 transfers (806) the queued BERR associated with UE $102_1$, that is, $BERR_{102\_1}$, including all of the priority information associated with the BERR, from the first bearer establishment request queue associated with cell $112_1$, that is, bearer establishment request queue $308_1$, to a second bearer establishment request queue that is associated with cell $112_2$, that is, bearer establishment request queue $308_2$. As part of moving $BERR_{102\_1}$ from bearer establishment request queue $308_1$ to bearer establishment request queue $308_2$, QAC function 154 places (808) $BERR_{102\_1}$ in a position in bearer establishment request queue $308_2$ based on, that is, in correspondence to, the transferred priority information of the BERR. Logic flow diagram 800 then ends (810).

Figure 9:
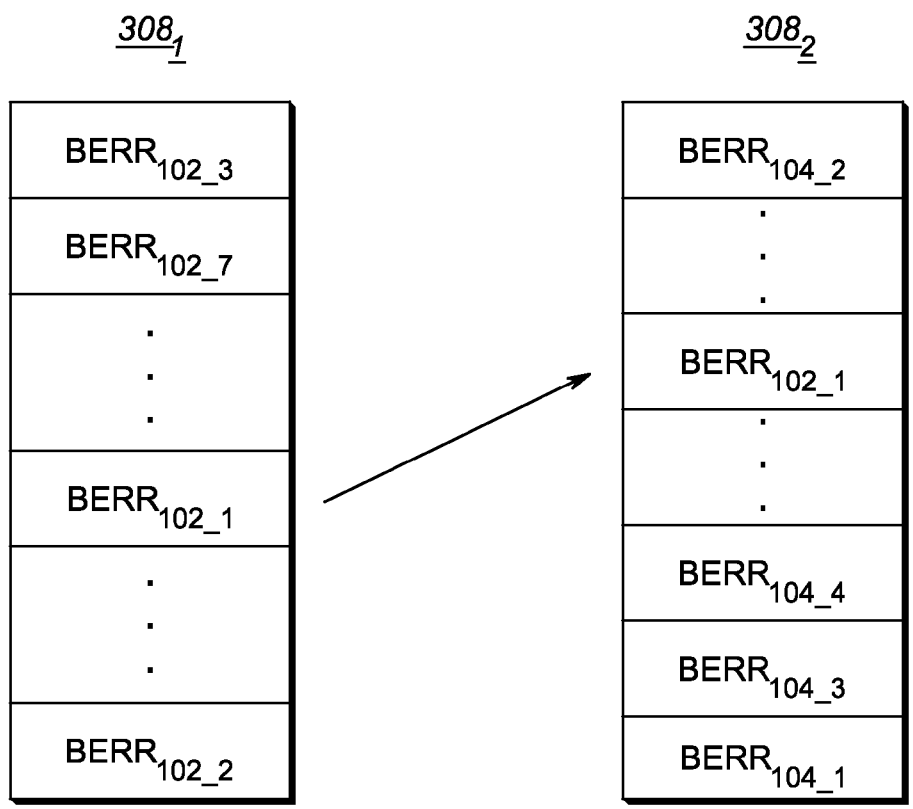
FIG. 9 is a block diagram illustrating a transfer of bearer establishment request between bearer establishment request queues in accordance with various embodiments of the present invention.

For example and referring now to FIG. 9, when the position of a BERR in a bearer establishment request queue is based on an age of the BERR, that is, a length of time that the BERR has been queued, QAC function 154 places the transferred BERR, that is, $BERR_{102\_1}$, in a position in bearer establishment request queue $308_2$ such that $BERR_{102\_1}$ is positioned above BERRs (for example, $BERR_{104\_1}$, $BERR_{104\_3}$, and $BERR_{104\_4}$ that are associated with UEs $104_1$, $104_3$, and $104_4$, respectively) that have been queued in bearer establishment request queue $308_2$ for a shorter period of time, that is, that are newer BERRs, than the period of time that the transferred BERR was queued in bearer establishment request queue $308_1$, and below BERRs (for example, $BERR_{104\_2}$ that is associated with UE $104_2$) that have been queued in bearer establishment request queue $308_2$ for a longer time, that is, that are older BERRs, than the period of time that $BERR_{102\_1}$ was queued in bearer establishment request queue $308_1$.

Similarly, by way of another example, when the position of a BERR in a bearer establishment request queues $308_1$ and $308_2$ corresponds to a QoS or a prioritization of the service or application associated with the corresponding bearer establishment request, then transferred $BERR_{102\_1}$ would be positioned in the bearer establishment request queue $308_2$ above BERRs that are already stored in bearer establishment request queue $308_2$ and that are associated with a lower QoS or service or application prioritization, again for example $BERR_{104\_1}$, $BERR_{104\_3}$, and $BERR_{104\_4}$, and below BERRs that are already stored in bearer establishment request queue $308_2$ and that are associated with a higher QoS or service or application prioritization, again for example $BERR_{104\_2}$.

In another embodiment of the present invention, separate QAC functions implemented in two different AFs, such as a first QAC function 154 and a second QAF function 158 respectively implemented at a first AF 152 and a second AF 156 of a respective first services network element and second services network element, may be competing for bearer allocation at a same congested cell served by an eNodeB. For example, AF 152 may comprise a State Public Safety Department PTT server coupled to a State Public Safety Department Priority Manager that implements a first QAC function, and AF 156 may comprise a Federal Public Safety Department PTT server coupled to a Federal Public Safety Department Priority Manager that implements a second QAC function. Each of QAC function 154 and QAC function 158 may contain queued BERRs associated with bearer establishment requests for a same congested cell, such as cell $112_1$.

In one such embodiment of the present invention, the separate bearer establishment request queues for the same congested cell may be coordinated and operated as a single virtual bearer establishment request queue that preserves the desired ordering of the set consisting of the union of their queued requests. In order to facilitate doing so, communication system 100 may implement a queue coordination protocol, for example, at an AF in services network 150 that is associated with either of the QAC functions, at both AFs wherein functions of the queue coordination protocol are shared among the AFs, or at PCRF 138, between the QAC functions 154, 158.

In another embodiment of the present invention, a reduced likelihood that a lower priority BERR at the head of one bearer establishment request queue would obtain resources when there is simultaneously a higher priority BERR at the head of a bearer establishment request queue for the same cell in a different QAC function may be achieved by using a retry rate, in the corresponding QAC functions, for the BERR at the head of a bearer establishment request queue that is based on the pending request's priority. A pending BERR using a higher retry rate has a higher likelihood of bearer establishment than does a pending BERR at the head of a different queue using a lower retry rate. This approach helps to improve a priority ordering among separate QAC functions, such as a first QAC function 154 and a second QAC function 158, for example, when implemented at a respective first and second services network element, but it is still possible that a high priority request at the tail of a long queue could be admitted later than a low priority request at the head of a different, shorter queue for the same cell. If priority ordering is not needed, First-In First-Out (FIFO) ordering among separate queues could be encouraged by applying a faster retry rate for a first BERR, at a head of a first bearer establishment request queue, which has been waiting a longer period of time than a retry rate applied for a second BERR, at a head of a second, different bearer establishment request queue, which second BERR has been waiting a shorter period of time. The separate QAC functions may be configured to both use a same retry rate when the same priority level is used in each QAC function. However, one may note that there may be practical limits on the maximum and minimum retry rates based on the signaling capacity and response time of the EPC and the access networks, as well as the potential delay that can be introduced with a low retry rate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for queued admissions control by a services network element, wherein the method comprises:
   receiving, by a services network element and from a core network, a bearer establishment request associated with a user equipment served by an access network, wherein the services network element implements an application function and resides outside of the access network and the core network;
   determining, by the services network element, that a cell where the user equipment is located is congested;
   in response to determining that the cell is congested, creating, by the services network element, a bearer establishment request record (BERR) associated with the user equipment and the bearer establishment request, wherein the BERR comprises priority information associated with the BERR; and
   adding, by the services network element, the BERR to a queue, wherein the queue is associated with a cell serving the user equipment, wherein the BERR is positioned in the queue based on the priority information, and wherein bearer establishment requests associated with BERRs in the queue are submitted based on a position of the BERRs in the queue.

2. The method of claim 1, further comprising subsequent to adding the bearer establishment request record (BERR) to the queue, submitting a bearer establishment request associated with the BERR based on the position of the BERR in the queue.

3. The method of claim 2, wherein submitting a bearer establishment request associated with the BERR based on a position of the BERR in the queue comprises submitting the bearer establishment request based on a retry rate and wherein the retry rate is based on the priority information associated with the BERR.

4. The method of claim 2, wherein submitting a bearer establishment request associated with the bearer establishment request record (BERR) comprises determining that channel capacity is available at the cell associated with the queue and submitting the bearer establishment request in response to determining that channel capacity is available.

5. The method of claim 4, wherein determining that channel capacity is available at the cell associated with the queue comprises determining that another user equipment allocated a bearer with associated channel capacity at the cell has one or more of relinquished the bearer, been handed over to another cell, or had the channel capacity reduced which was allocated to the bearer.

6. The method of claim 4, wherein determining that channel capacity is available at the cell associated with the queue comprises:
transmitting an announcement that the cell is congested; and
in response to transmitting the announcement, receiving an indication from a user equipment that the user equipment has left the congested cell.

7. The method of claim 1, wherein determining that a cell where the user equipment is located is congested comprises:
transmitting an announcement that the cell is congested; and
in response to the announcement, receiving an indication from a user equipment that the user equipment is one or more of in the congested cell or entering the congested cell.

8. The method of claim 1, further comprising:
in response to adding the bearer establishment request record (BERR) to the queue, starting a queue timer; and
in response to an expiration of the queue timer, deleting the BERR from the queue.

9. The method of claim 8, further comprising:
subsequent to adding the bearer establishment request record (BERR) to the queue, submitting a bearer request associated with the BERR based on a position of the BERR in the queue;
in response to submitting the bearer request, starting a resubmission timer; and
in response to an expiration of the resubmission timer, resubmitting a bearer request associated with the BERR from the queue.

10. The method of claim 1, further comprising:
subsequent to adding the bearer establishment request record (BERR) to the queue, submitting a bearer establishment request associated with the BERR based on a position of the BERR in the queue;
in response to submitting the bearer establishment request, determining that channel capacity is allocated to the request; and
in response to determining that channel capacity is allocated to the request, deleting the BERR from the queue.

11. The method of claim 1, further comprising:
subsequent to adding the bearer establishment request record (BERR) to the queue, submitting a bearer establishment request associated with the BERR based on a position of the BERR in the queue;
in response to submitting the bearer establishment request, determining that channel capacity cannot be allocated to the request; and
in response to determining that channel capacity cannot be allocated to the request, maintaining the BERR in the queue.

12. The method of claim 1, wherein the priority associated with the BERR comprises one or more of an age of the BERR and a prioritization of a service associated with the bearer establishment request.

13. The method of claim 12, wherein the priority associated with the BERR comprises the prioritization of a service associated with the bearer establishment request and wherein the prioritization of a service associated with the bearer establishment request comprises one or more of a Quality of Service (QoS) associated with the bearer establishment request and a priority of an application associated with the bearer establishment request.

14. The method of claim 1, wherein the queue comprises a first queue maintained by the services network element and wherein the method further comprises:
determining that the user equipment has moved to a new cell;
in response to determining that the user equipment has moved, transferring, by the services network element, the bearer establishment request record (BERR) associated with the user equipment, along with the associated priority information, to a second queue maintained by the services network element and associated with the new cell; and
positioning the BERR in the second queue based on the transferred priority information, wherein bearers are allocated to BERRs in the second queue associated with the new cell based on their position in the second queue.

15. The method of claim 1, wherein the queue comprises a first queue and wherein the method further comprises:
maintaining a bearer establishment request record (BERR) associated with another user equipment in a second queue, wherein the first queue and the second queue are maintained by different network elements and wherein the first queue and the second queue are for a same congested cell; and
operating the first queue and the second queue as a single virtual bearer establishment request queue that preserves a desired ordering of a set consisting of the union of the queued BERRs in the first and second queues.

16. The method of claim 1, wherein the queue comprises a first queue and wherein the method further comprises:
maintaining a bearer establishment request record (BERR) associated with another user equipment in a second queue, wherein the first queue and the second queue are maintained by different network elements and wherein the first queue and the second queue each queue for a same congested cell; and
applying a faster retry rate for a BERR at a head of one of the first and second queues which has been waiting a longer period of time than a retry rate applied to a BERR at a head of the other of the first and second queues and which BERR been waiting which has been waiting a shorter period of time.

17. The method of claim 1, wherein the queue comprises a first queue and wherein the method further comprises:
maintaining a bearer establishment request record (BERR) associated with another user equipment in a second queue, wherein the first queue and the second queue are maintained by different network elements and wherein the first queue and the second queue each queue for a same congested cell; and
applying a faster retry rate for a BERR at a head of one of the first and second queues which has a higher priority than a retry rate applied to a BERR at a head of the other of the first and second queues and which BERR has a lower priority.

18. The method of claim 1, wherein determining that a cell where the user equipment is located is congested comprises determining that a lack of available channel capacity prevents a radio bearer from being established to fill the bearer establishment request.

19. The method of claim 1, further comprising:
maintaining, by the services network element, a plurality of bearer establishment request record (BERR) queues, wherein the plurality of BERR queues are associated with a plurality of different NodeBs.

20. A services network element that provides for queued admissions control in a wireless communication system, wherein the services network element resides outside of an access network and a core network of the wireless communication system and wherein the services network element comprises:
a processor that implements an application function that is configured to:
receive, from the core network, a bearer establishment request associated with a user equipment served by the access network;
determine that a cell where the user equipment is located is congested;
in response to determining that the cell is congested, create a bearer establishment request record (BERR) associated with the user equipment and the bearer establishment request, wherein the BERR comprises priority information associated with the BERR; and
add the BERR to a queue, wherein the queue is associated with a cell serving the user equipment, wherein the BERR is positioned in the queue based on the priority information, and wherein bearer establishment requests associated with BERRs in the queue are submitted based on a position of the BERRs in the queue.

21. The services network element of claim 20, wherein the services network element further comprises:
an at least one memory device that maintains a plurality of bearer establishment request record (BERR) queues, wherein the plurality of BERR queues are associated with a plurality of different NodeBs.

22. The services network element of claim 20, wherein the queue comprises a first queue that is maintained by the services network element and wherein the processor further is configured to:
determine that the user equipment has moved to a new cell;
in response to determining that the user equipment has moved, transfer the bearer establishment request record (BERR) associated with the user equipment, along with the associated priority information, to a second queue maintained by the services network element and associated with the new cell; and
position the BERR in the second queue based on the transferred priority information, wherein bearers are allocated to BERRs in the second queue associated with the new cell based on their position in the second queue.

23. The services network element of claim 20, wherein the processor is configured to determine that a cell where the user equipment is located is congested by determining that a lack of available channel capacity prevents a radio bearer from being established to fill the bearer establishment request.

24. The services network element of claim 20, wherein the services network element is an Application Server.

25. The services network element of claim 20, wherein the processor is configured to maintain separate queues for bearer establishment requests that request only uplink capacity and for bearer establishment requests that request only downlink capacity.

26. An apparatus that provides for queued admissions control in a wireless communication system, the apparatus comprising:
a first services network element that is configured to:
receive a bearer establishment request associated with a user equipment;
determine that a cell where the user equipment is located is congested;
in response to determining that the cell is congested, create a bearer establishment request record (BERR) associated with the user equipment and the bearer establishment request, wherein the BERR comprises priority information associated with the BERR;
add the BERR to a first queue, wherein the first queue is associated with a cell serving the user equipment, wherein the BERR is positioned in the first queue based on the priority information, and wherein channel capacity is allocated to BERRs in the first queue based on their position in the first queue;
determine that the user equipment has moved to a new cell;
in response to determining that the user equipment has moved, transferring the bearer establishment request record (BERR) associated with the user equipment, along with the associated priority information, to a second services network element;
a second services network element that is configured to:
maintain a BERR associated with another user equipment in a second queue, wherein the first queue and the second queue are for a same congested cell; and
wherein the first services network element and the second services network element are configured to operate the first queue and the second queue as a single virtual bearer establishment request queue that preserves a desired ordering of a set consisting of the union of the queued BERRs in the first and second queues.

27. The apparatus of claim 25, wherein the first services network element and the second services network element are configured to apply a faster retry rate for a bearer establishment request record (BERR) at a head of one of the first and second queues which has been waiting a longer period of time than a retry rate applied to a BERR at a head of the other of the first and second queues and which BERR been waiting which has been waiting a shorter period of time.

28. The apparatus of claim 26, wherein the first services network element and the second services network element are configured to apply a faster retry rate for a bearer establishment request record (BERR) at a head of one of the first and second queues which has a higher priority than a retry rate applied to a BERR at a head of the other of the first and second queues and which BERR has a lower priority.

* * * * *